(12) United States Patent
Seok

(10) Patent No.: US 11,592,180 B2
(45) Date of Patent: Feb. 28, 2023

(54) COMBUSTOR NOZZLE, COMBUSTOR, AND GAS TURBINE INCLUDING SAME

(71) Applicant: DOOSAN ENERBILITY CO., LTD, Changwon-si (KR)

(72) Inventor: Jungmin Seok, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/531,769

(22) Filed: Nov. 21, 2021

(65) Prior Publication Data
US 2022/0220897 A1   Jul. 14, 2022

(30) Foreign Application Priority Data
Jan. 13, 2021   (KR) .......................... 10-2021-0004879

(51) Int. Cl.
| | |
|---|---|
| *F23R 3/34* | (2006.01) |
| *F23R 3/36* | (2006.01) |
| *F23R 3/28* | (2006.01) |
| *F02C 7/22* | (2006.01) |

(52) U.S. Cl.
CPC ................ *F23R 3/36* (2013.01); *F02C 7/22* (2013.01); *F23R 3/286* (2013.01); *F23R 3/343* (2013.01); *F23R 3/346* (2013.01); *F05D 2220/75* (2013.01)

(58) Field of Classification Search
CPC ...... F23R 3/286; F23R 3/36; F23R 3/34–346; F23R 2900/00013; F23R 3/28–283; F02C 7/22; F02C 3/22; F23D 2900/00008; F23D 2900/14002–14003; F23D 2900/14641; F23D 2203/102–1023; F23D 2203/105–1055; F23D 14/20; F23D 14/58–586

See application file for complete search history.

(56) References Cited

U.S. PATENT DOCUMENTS

| | | | |
|---|---|---|---|
| 9,976,522 B2 * | 5/2018 | Patel ...................... F02M 29/06 |
| 10,072,848 B2 * | 9/2018 | Berry ...................... F02C 7/222 |
| 10,100,741 B2 * | 10/2018 | Huntington .............. F02C 3/34 |
| 11,306,661 B1 * | 4/2022 | Brightwell ............. F02C 7/222 |

(Continued)

FOREIGN PATENT DOCUMENTS

| | | |
|---|---|---|
| JP | 3961225 B2 | 8/2007 |
| JP | 2010266185 A | 11/2010 |

(Continued)

OTHER PUBLICATIONS

KR OA dated May 23, 2022.

*Primary Examiner* — Stephanie Sebasco Cheng
*Assistant Examiner* — Jingchen Liu
(74) *Attorney, Agent, or Firm* — Harvest IP Law LLP

(57) ABSTRACT

A nozzle for a combustor in which a fuel containing hydrogen is burned is provided. The nozzle includes a first tube disposed in a center of the nozzle and having a first diameter, a plurality of second tubes circumferentially disposed around the first tube to be spaced apart from the first tube and each having a second diameter smaller than that of the first tube, and a plurality of third tubes disposed around the first tube and each having a diameter smaller than the second diameter, wherein the first tube, the plurality of second tubes, and the plurality of third tubes are arranged in parallel with each other.

14 Claims, 6 Drawing Sheets

(56) References Cited

U.S. PATENT DOCUMENTS

| | | | | |
|---|---|---|---|---|
| 2008/0078183 A1* | 4/2008 | Ziminsky | ............... | F23R 3/14 |
| | | | | 60/737 |
| 2011/0036092 A1* | 2/2011 | Lawson | ............... | F23K 5/002 |
| | | | | 60/734 |
| 2012/0180487 A1* | 7/2012 | Uhm | ............... | F23R 3/286 |
| | | | | 60/737 |
| 2013/0086910 A1* | 4/2013 | Khan | ............... | F23R 3/14 |
| | | | | 60/737 |
| 2013/0167539 A1* | 7/2013 | Berry | ............... | F23R 3/286 |
| | | | | 60/737 |
| 2021/0180518 A1* | 6/2021 | Koganezawa | ............... | F02C 7/222 |

FOREIGN PATENT DOCUMENTS

| | | | |
|---|---|---|---|
| JP | 2013139779 | A | 7/2013 |
| JP | 6067364 | B2 | 1/2017 |
| JP | 6483957 | B2 | 3/2019 |
| JP | 6487847 | B2 | 3/2019 |
| JP | 6557463 | B2 | 8/2019 |
| KR | 10 2049042 | B1 | 11/2019 |

\* cited by examiner

COMBUSTOR NOZZLE, COMBUSTOR, AND GAS TURBINE INCLUDING SAME

CROSS REFERENCE TO RELATED APPLICATION

This application claims priority to Korean Patent Application No. 10-2021-0004879, filed on Jan. 13, 2021, the entire disclosure of which is incorporated herein by reference in its entirety.

BACKGROUND

1. Field

Apparatuses and methods consistent with exemplary embodiments relate to a combustor nozzle, a combustor, and a gas turbine and, more particularly, to a combustor nozzle using fuel containing hydrogen, a combustor, and a gas turbine including the same.

2. Description of the Related Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine includes a compressor, a combustor, and a turbine. The compressor serves to intake external air, compress the air, and transfer the compressed air to the combustor. The compressed air compressed by the compressor has a high temperature and a high pressure. The combustor serves to mix compressed air compressed by the compressor and fuel and combust the mixture of compressed air and fuel to produce combustion gas discharged to the gas turbine. The combustion gas drives turbine blades in the turbine to produce power. The generated power is applied to various fields such as power generation and driving of machinery.

Fuel is injected through nozzles disposed in each combustor and the fuel includes gas fuel and liquid fuel. In recent years, to reduce the emission of carbon dioxide, it is recommended to use hydrogen fuel or a fuel containing hydrogen.

However, because hydrogen has a high combustion rate, when such fuels are burned with a gas turbine combustor, the flame formed in the gas turbine combustor approaches the structure of the gas turbine combustor and is heated, thereby reducing the reliability of the gas turbine combustor. However, it is difficult to stabilize the flame when a turbine is started, so vibration occurs during a ramp-up process.

SUMMARY

Aspects of one or more exemplary embodiments provide a combustor nozzle capable of minimizing vibration in combusting hydrogen fuel, a combustor, and a gas turbine including the same.

Additional aspects will be set forth in part in the description which follows and, in part, will become apparent from the description, or may be learned by practice of the exemplary embodiments.

According to an aspect of an exemplary embodiment, there is provided a nozzle for a combustor in which a fuel containing hydrogen is burned, the nozzle including: a first tube disposed in a center of the nozzle and having a first diameter; a plurality of second tubes circumferentially disposed around the first tube to be spaced apart from the first tube and each having a second diameter smaller than that of the first tube; and a plurality of third tubes disposed around the first tube and each having a diameter smaller than the second diameter, wherein the first tube, the plurality of second tubes, and the plurality of third tubes are arranged in parallel with each other.

The first tube, the plurality of second tubes, and the plurality of third tubes may be supplied with different types of fuel.

The plurality of second tubes may be supplied with a fuel mixture of hydrogen fuel and natural gas, and the plurality of third tubes may be supplied with hydrogen fuel.

The first tube may be supplied with natural gas, and the first tube may include a central inner fuel path through which fuel flows, an outer premix path surrounding the inner fuel path and through which an air-fuel mixture flows, and a plurality of swirlers installed in the outer premix path to induce a vortex.

The plurality of third tubes may include inner third tubes disposed between the first tube and the second tubes, middle third tubes disposed between the second tubes, and outer third tubes disposed outside of the second tubes.

The plurality of second tubes may be arranged in two rows and include inner second tubes and outer second tubes disposed outside of the inner second tubes.

The inner second tube may have a diameter larger than that of the outer second tube.

The first tube, the plurality of second tubes, and the plurality of third tubes may be supplied with fuel with a time difference.

Fuel may be supplied to the plurality of second tubes after fuel is supplied to the first tube, and fuel may be supplied to the plurality of third tubes after fuel is supplied to the plurality of second tubes.

Fuel may be supplied to the plurality of third tubes after fuel is supplied to the first tube, and fuel may be supplied to the plurality of second tubes after fuel is supplied to the plurality of third tubes.

According to an aspect of another exemplary embodiment, there is provided a combustor including: a burner having a plurality of nozzles configured to inject fuel and air; and a duct assembly coupled to one side of the burner to combust a mixture of the fuel and air and transmit combustion gas to a turbine, each of the plurality of nozzles including: a first tube disposed in a center of the nozzle and having a first diameter; a plurality of second tubes circumferentially disposed around the first tube to be spaced apart from the first tube and each having a second diameter smaller than that of the first tube; and a plurality of third tubes disposed around the first tube and each having a diameter smaller than the second diameter, wherein the first tube, the plurality of second tubes, and the plurality of third tubes are arranged in parallel with each other.

The first tube, the plurality of second tubes, and the plurality of third tubes may be supplied with different types of fuel.

The first tube may be supplied with natural gas, the plurality of second tubes may be supplied with a fuel mixture of hydrogen fuel and natural gas, and the plurality of third tubes may be supplied with hydrogen fuel.

The first tube may include a central inner fuel path through which fuel flows, an outer premix path surrounding the inner fuel path and through which an air-fuel mixture flows, and a plurality of swirlers installed in the outer premix path to induce a vortex.

The plurality of third tubes may include inner third tubes disposed between the first tube and the second tubes, middle third tubes disposed between the second tubes, and outer third tubes disposed outside of the second tubes.

The plurality of second tubes may be arranged in two rows and include inner second tubes and outer second tubes disposed outside of the inner second tubes.

The inner second tube may have a diameter larger than that of the outer second tube.

The first tube, the plurality of second tubes, and the plurality of third tubes may be supplied with fuel with a time difference.

According to an aspect of another exemplary embodiment, there is provided a gas turbine including: a compressor configured to compress an air introduced from an outside; a combustor configured to mix the air compressed by the compressor with fuel and combust an air-fuel mixture to produce combustion gas; and a turbine having a plurality of turbine blades rotated by the combustion gas produced from the combustor, the combustor including: a burner having a plurality of nozzles configured to inject fuel and air; and a duct assembly coupled to one side of the burner to combust a mixture of the fuel and air and transmit combustion gas to the turbine, each of the plurality of nozzles including: a first tube disposed in a center of the nozzle and having a first diameter; a plurality of second tubes circumferentially disposed around the first tube to be spaced apart from the first tube and each having a second diameter smaller than that of the first tube; and a plurality of third tubes disposed around the first tube and each having a diameter smaller than the second diameter, wherein the first tube, the plurality of second tubes, and the plurality of third tubes are arranged in parallel with each other.

The first tube, the plurality of second tubes, and the plurality of third tubes may be supplied with different types of fuel.

As described above, according to one or more exemplary embodiments, the first tube, the second tube, and the third tube having different diameters are arranged in parallel without overlapping each other to minimize the generation of vibration at the beginning of combustion.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
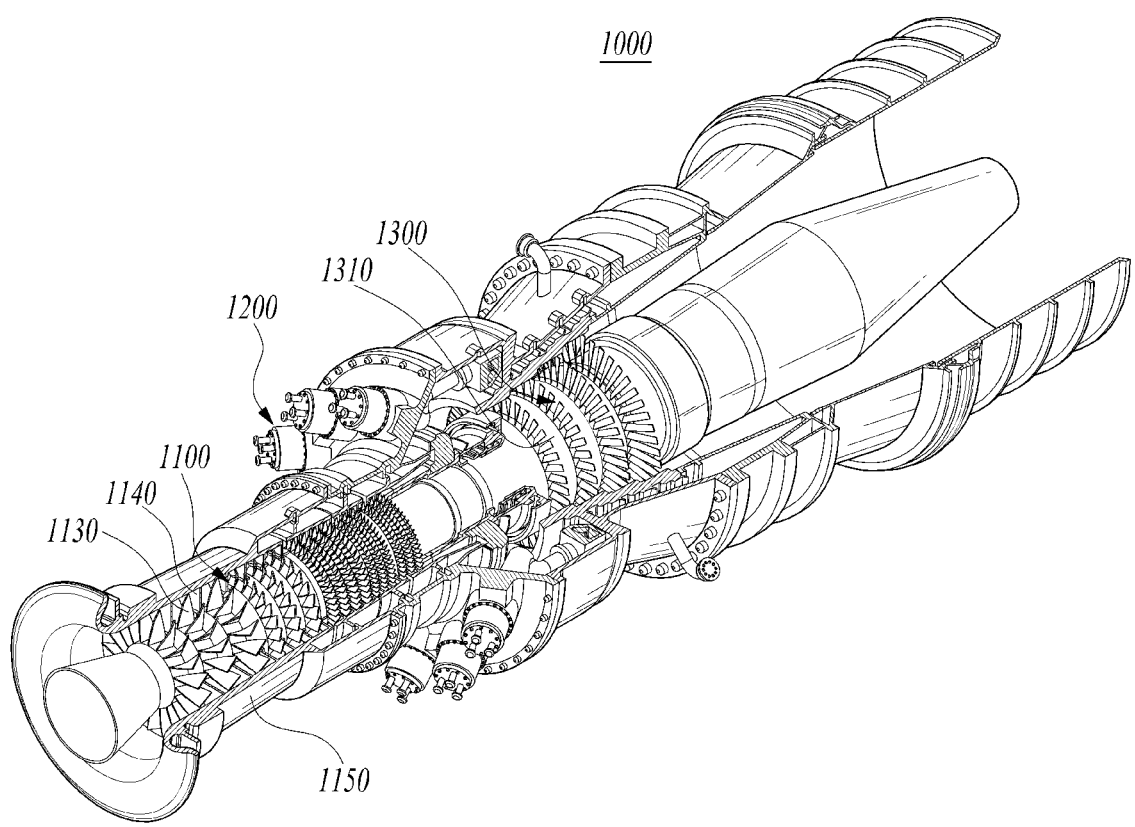
FIG. 1 is a view illustrating an interior of a gas turbine according to a first exemplary embodiment.

Various modifications and various embodiments will be described in detail with reference to the accompanying drawings. However, it should be noted that the various embodiments are not for limiting the scope of the disclosure to the specific embodiment, but they should be interpreted to include all of modifications, equivalents or substitutions of the embodiments included within the spirit and scope disclosed herein.

Terms used herein are used to merely describe specific embodiments, and are not intended to limit the scope of the disclosure. As used herein, an element expressed as a singular form includes a plurality of elements, unless the context clearly indicates otherwise. Further, it will be understood that the terms "including" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, exemplary embodiments will be described in detail with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Hereinafter, a gas turbine according to a first exemplary embodiment will be described with reference to the accompanying drawings.

Figure 2:
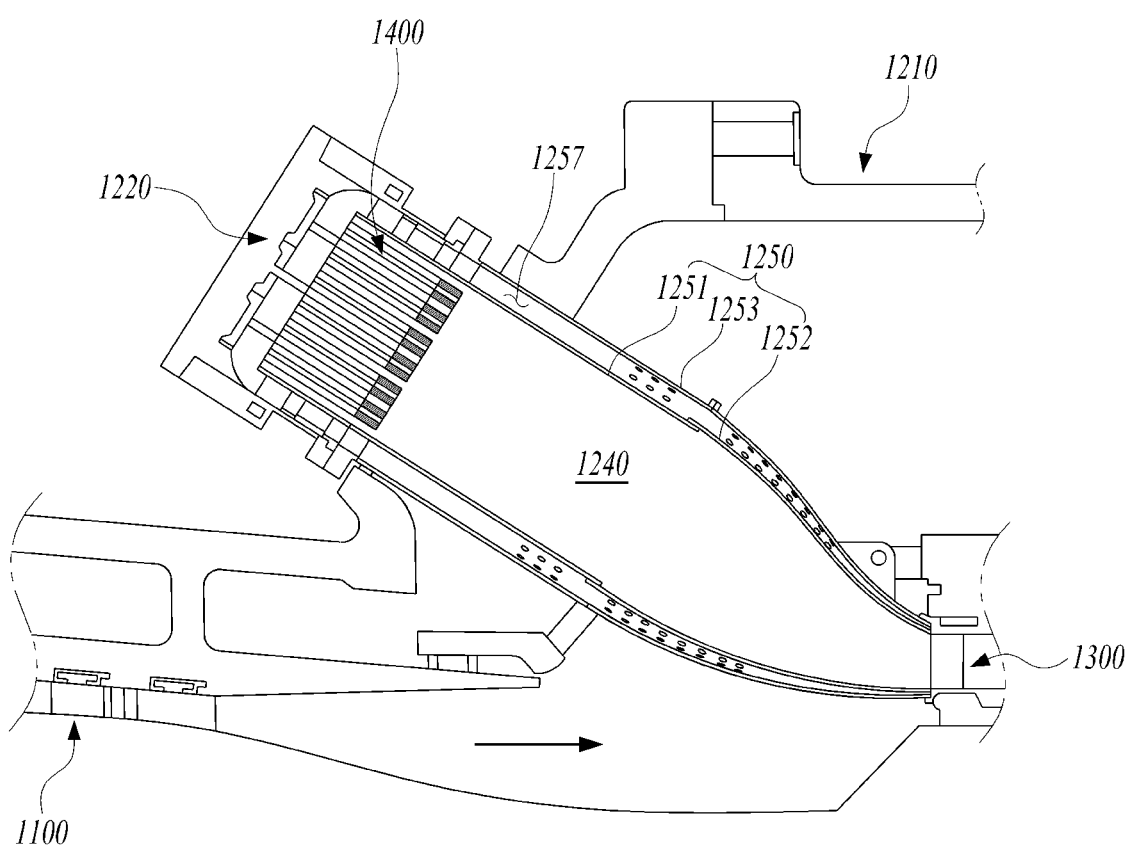
FIG. 2 is a view illustrating a combustor of FIG. 1.

FIG. 1 is a view illustrating an interior of a gas turbine according to an exemplary embodiment, and FIG. 2 is a view illustrating a combustor of FIG. 1.

An ideal thermodynamic cycle of a gas turbine 1000 may ideally comply with the Brayton cycle. The Brayton cycle consists of four thermodynamic processes: isentropic compression (i.e., an adiabatic compression) process, isobaric combustion process, isentropic expansion (i.e., an adiabatic expansion) process and isobaric heat ejection process. That is, in the Brayton cycle, thermal energy may be released by combustion of fuel in an isobaric environment after atmospheric air is sucked and compressed into high pressure air, hot combustion gas may be expanded to be converted into kinetic energy, and exhaust gas with residual energy may be discharged to the outside. As such, the Brayton cycle consists of four thermodynamic processes including compression, heating, expansion, and heat ejection.

The gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may supply the compressed air by compressor blades 1130 to a combustor 1200 and also supply the cooling air to a high temperature region of the gas turbine 1000. Here, because the sucked air is compressed in the compressor 1100 through an adiabatic compression process, the pressure and temperature of the air passing through the compressor 1100 increases.

The compressor 1100 may be designed in the form of a centrifugal compressor or an axial compressor, and the centrifugal compressor is applied to a small-scale gas turbine, whereas a multi-stage axial compressor is applied to a large-scale gas turbine 1000 illustrated in FIG. 1 to compress a large amount of air. In the multi-stage axial compressor, the compressor blades 1130 rotate according to the rotation of rotor disks, compress the introduced air and move the compressed air to compressor vanes 1140 disposed at a following stage. The air is compressed gradually to a high pressure while passing through the compressor blades 1130 formed in multiple stages.

The compressor vanes 1140 are mounted inside a housing 1150 in such a way that a plurality of compressor vanes 1140 form each stages. The compressor vanes 1140 guide the compressed air moved from compressor blades 1130 disposed at a preceding stage toward compressor blades 1130 disposed at a following stage. For example, at least some of the compressor vanes 1140 may be mounted so as to be rotatable within a predetermined range, e.g., to adjust an air inflow.

The compressor 1100 may be driven using a portion of the power output from the turbine 1300. To this end, as illustrated in FIG. 1, a rotary shaft of the compressor 1100 and a rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The turbine 1300 includes a rotor disk 1310 and a plurality of turbine blades and turbine vanes radially disposed on the rotor disk 1310. The rotor disk 1310 has a substantially disk shape on which a plurality of grooves are formed. The plurality of grooves are formed to have curved surfaces, and turbine blades and turbine vanes are inserted into the grooves. The turbine vanes are fixed against rotation and guide a flow of combustion gas through the turbine blades. The turbine blades are rotated by combustion gas to generate rotational force.

The combustor 1200 may mix the compressed air supplied from an outlet of the compressor 1100 with fuel and combust the mixture at constant pressure to produce hot combustion gas. FIG. 2 illustrates an example of the combustor 1200 provided in the gas turbine 1000. The combustor 1200 may include a combustor casing 1210, burners 1220, nozzles 1400, and a duct assembly 1250.

Referring to FIG. 2, the combustor casing 1210 may have a substantially circular shape in which the burners 1220 are surrounded. The burners 1220 may be disposed along the annular combustor casing 1210 downstream of compressor 1100. Each burner 1220 may include a plurality of nozzles 1400 through which fuel is injected and mixed with air in an appropriate ratio to form a fuel-air mixture having conditions suitable for combustion.

The gas turbine 1000 may use gas fuel, for example, a fuel containing hydrogen. The fuel may include a hydrogen fuel or a fuel containing hydrogen and natural gas.

The duct assembly 1250 is provided to connect a section between the burners 1220 and the turbine 1300 so that the compressed air flows along an outer surface of the duct assembly 1250, along which the hot combustion gas flows to heat the duct assembly 1250, thereby properly cooling the heated duct assembly 1250.

The duct assembly 1250 may include a liner 1251 and a transition piece 1252, and a flow sleeve 1253. The duct assembly 1250 has a double structure in which the flow sleeve 1253 surrounds an outside of the liner 1251 and the transition piece 1252, so that compressed air penetrates into an annular space 1257 inside the flow sleeve 1253 to cool the liner 1251 and the transition piece 1252.

The liner 1251 is a tube member connected to the burners 1220 of the combustor 1200, and the combustion chamber 1240 is an internal space of the liner 1251. The liner 1251 has one longitudinal end coupled to the burner 1220 and the other longitudinal end coupled to the transition piece 1252.

The transition piece 1252 is connected an inlet of the turbine 1300 to guide the high-temperature combustion gas toward the turbine 1300. The transition piece 1252 has one longitudinal end coupled to the liner 1251 and the other longitudinal end coupled to the turbine 1300. The flow sleeve 1253 serves to protect the liner 1251 and the transition piece 1252 while preventing hot air from being directly discharged to the outside.

Figure 3:
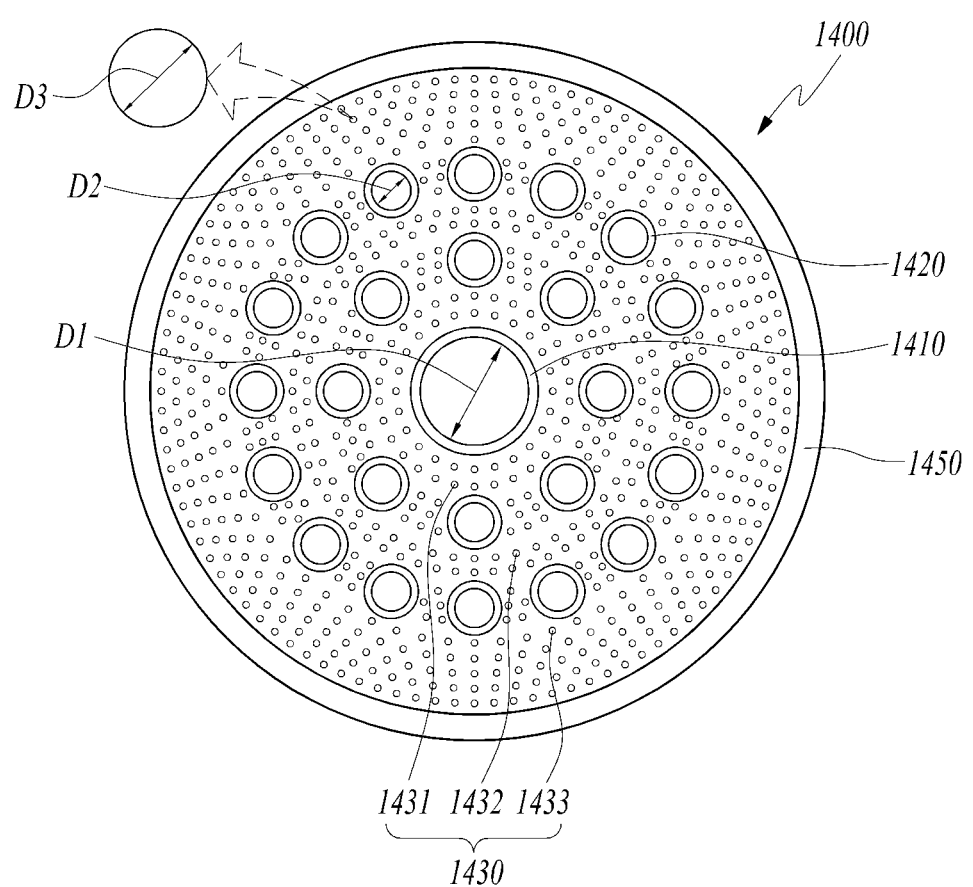
FIG. 3 is a sectional view illustrating a nozzle cut along a radial direction according to the first exemplary embodiment.
Figure 4:
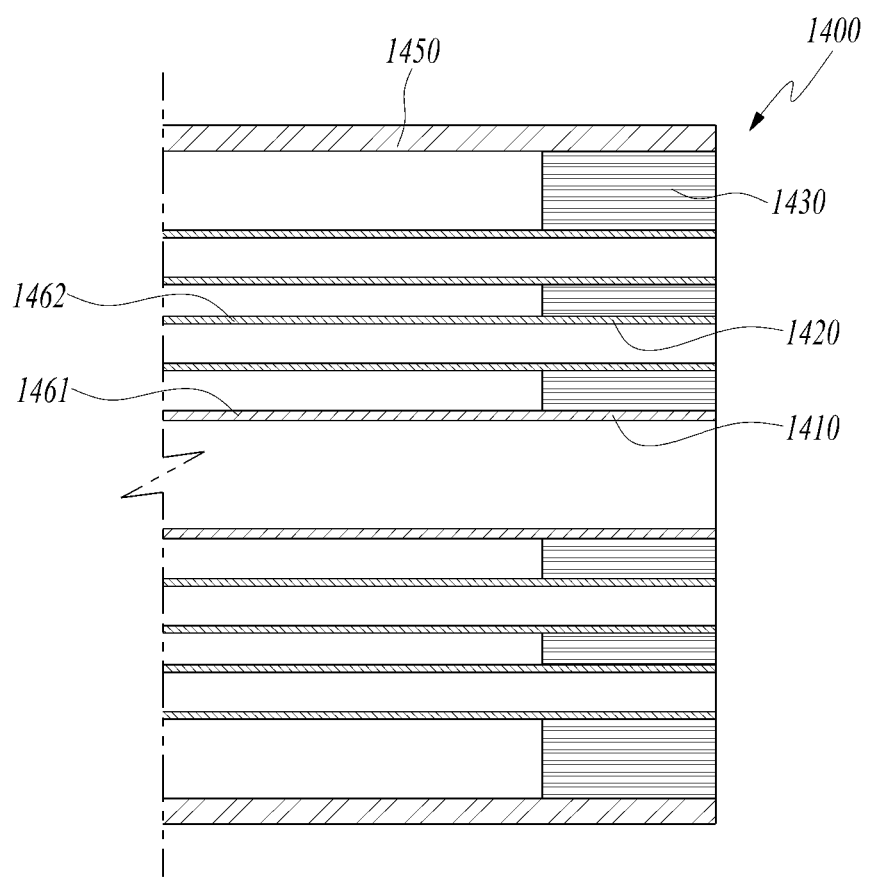
FIG. 4 is a sectional view illustrating a nozzle cut along a longitudinal direction according to the first exemplary embodiment.

FIG. 3 is a sectional view illustrating a nozzle cut along a radial direction according to the first exemplary embodiment, and FIG. 4 is a sectional view illustrating the nozzle cut along a longitudinal direction according to the first exemplary embodiment.

Referring to FIGS. 3 and 4, the nozzle 1400 includes a first tube 1410 disposed at a center of the nozzle, a plurality of second tubes 1420 disposed around the first tube 1410, a plurality of third tubes 1430 disposed around the first tube 1410 and having a smaller diameter than the second tubes 1420, and a nozzle shroud 1450 surrounding the tubes.

The nozzle shroud 1450 surrounds the first tube 1410, the second tubes 1420, and the third tubes 1430 to provide an air flow path. The nozzle shroud 1450 may have a cylindrical shape.

The first tube 1410 disposed at the center of the nozzle 1400 has the largest first diameter D1. Natural gas may be supplied through the first tube 1410. A first fuel supply pipe 1461 for supplying natural gas may be connected to the first tube 1410. Air is supplied to the first tube 1410 together with natural gas, so that an air-gas mixture can be injected from the first tube 1410.

The second tubes 1420 are circumferentially spaced apart from the first tube 1410 and each have a second diameter D2 smaller than that of the first tube 1410. A fuel in which natural gas and hydrogen are mixed is supplied together with air to the second tubes 1420. A second fuel supply pipe 1462 for supplying fuel may be connected to the second tube 1420.

The third tubes 1430 are disposed around the first tube 1410 and each have a third diameter D3 smaller than the second diameter D2. Hydrogen gas fuel may be supplied to the third tubes 1430 together with air for combustion.

The third tube 1430 has an injection port through which hydrogen gas is injected and combusted, and the third diameter D3 may be several mm or several cm. Hydrogen is very reactive and must be injected at a very high rate to avoid flashback, so an injection tube needs to have a very small diameter. Therefore, if the third tubes 1430 has a very small diameter, a flame may be stably formed using hydrogen.

The first tube 1410, the second tubes 1420, and the third tubes 1430 are arranged in parallel without overlapping each other, and different types of fuel are supplied. Accordingly, it is possible to mitigate vibration by controlling fuel injection during a ramp-up process of the combustor 1200. In addition, it is possible to provide an active response to combustor operation by configuring a fuel circuit in an increasing load situation so that only some tubes are fueled.

For example, the third tubes 1430 are supplied with hydrogen fuel, if a supply rate of hydrogen fuel increases, a flame is ejected so that it is difficult to stably maintain the flame. However, according to the exemplary embodiment, a flame generated in the first tube 1410 and the second tubes 1420 catches a flame generated in the third tubes 1430 to stably maintain the entire flame.

The third tubes 1430 may be spaced apart from the first tube 1410 in the circumferential direction and disposed in the nozzle shroud 1450 at regular intervals. The third tubes 1430 may include an inner group of tubes 1431 disposed between the first tube 1410 and the second tubes 1420, a middle group of tubes 1432 disposed between the inner group of tubes 1431 and the second tubes 1420, and an outer group of tubes 1433 disposed outside of the second tubes 1420.

As such, if the third tubes 1430 are provided outside of the second tubes 1420 as well as between the first tube 1410 and the second tubes 1420 and between the second tubes 1420, a flame formed by hydrogen gas is disposed between the flames formed by natural gas so that the combustor can maintain a uniform and stable flame.

When a combustor is operated, fuel is sequentially supplied to the first tube 1410, the second tubes 1420, and the third tubes 1430 with a time difference. Alternatively, according to the driving situation, fuel is first supplied to the first tube 1410, then fuel may be supplied to the third tubes 1430, and then fuel may be supplied to the second tubes 1420.

As described above, if different types of fuel are supplied to tubes having different diameters with a time difference in the initial operating process of the combustor 1200, vibration generated in the initial operating process of the combustor 1200 can be significantly reduced.

Figure 5:
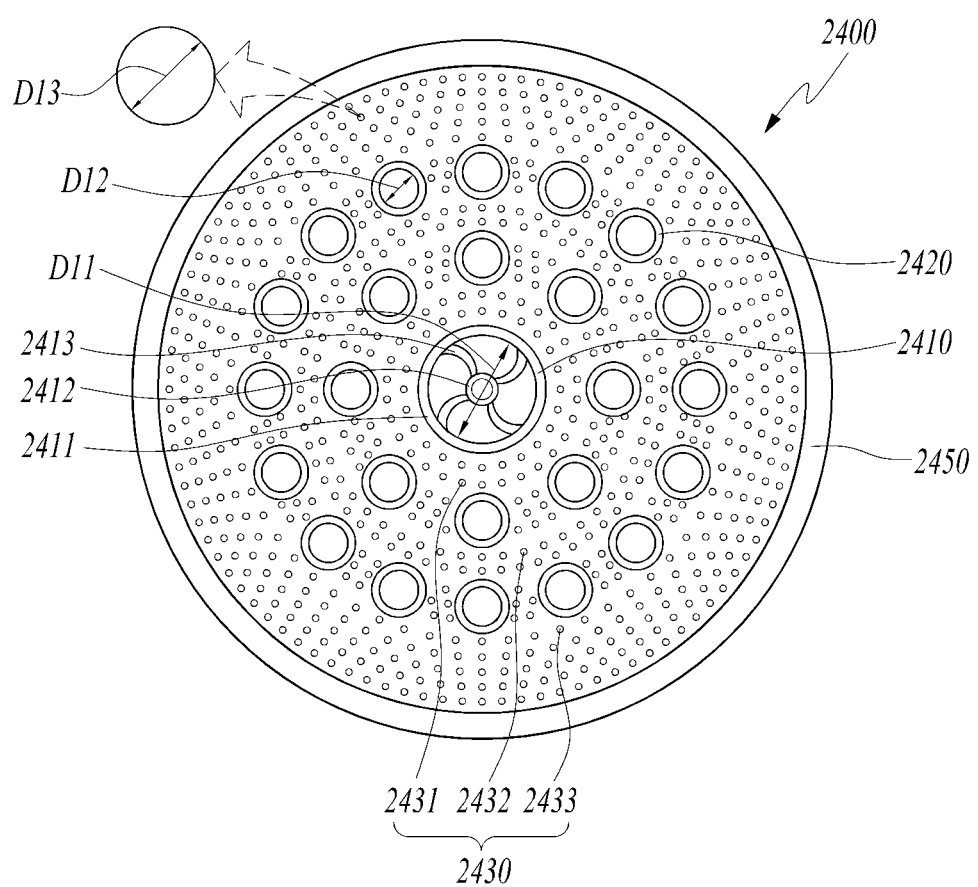
FIG. 5 is a sectional view illustrating a nozzle cut along the radial direction according to a second exemplary embodiment.

Hereinafter, a nozzle according to a second exemplary embodiment will be described. FIG. 5 is a sectional view illustrating a nozzle cut along the radial direction according to a second exemplary embodiment.

Referring to FIG. 5, the nozzle 2400 includes a first tube 2410 disposed at a center of the nozzle, a plurality of second tubes 2420 disposed around the first tube 2410, a plurality of third tubes 2430 disposed around the first tube 2410 and having a smaller diameter than the second tubes 2420, and a nozzle shroud 2450 surrounding the tubes.

The first tube 2410 is disposed at the center of the nozzle 2400 and has a largest first diameter D11. The second tubes 2420 are circumferentially spaced apart from the first tube 2410 and each have a second diameter D12 smaller than that of the first tube 2410.

The third tubes 2430 are disposed around the first tube 2410 and each have a third diameter D13 smaller than the second diameter D12. Hydrogen gas fuel may be supplied to the third tubes 2430 together with air for combustion.

The third tubes 2430 may be spaced apart from the first tube 2410 in the circumferential direction and disposed in the nozzle 2400 at regular intervals. The third tubes 2430 may include an inner group of tubes 2431 disposed between the first tube 2410 and the second tubes 2420, a middle group of tubes 2432 disposed between the inner group of tubes 2431 and the second tubes 2420, and an outer group of tubes 2433 disposed outside of the second tubes 2420.

The first tube 2410, the second tubes 2420, and the third tubes 2430 are disposed in parallel without overlapping each other, and different types of fuel are supplied. For example, natural gas may be supplied to the first tube 2410, fuel in which natural gas and hydrogen gas are mixed may be supplied to the second tubes 2420, and hydrogen gas may be supplied to the third tubes 2430.

The first tube 2410 may include a central inner fuel path 2412 through which fuel flows, an outer premix path 2411 surrounding the inner fuel path 2412 and through which an air-fuel mixture flows, and a plurality of swirlers 2413 installed in the outer premix path 2411 to induce a vortex.

The third tubes 2430 may be circumferentially disposed around the outer premix path 2411 to be partially spaced from the outer premix path 2411. The swirler 2413 may include a plurality of injection holes connected to the inner fuel path 2412 to inject fuel into the outer premix path 2411.

According to the second exemplary embodiment, if the first tube 2410 includes the inner fuel path 2412, the outer premix path 2411, and the swirlers 2413, and the third tubes 2430 for injecting hydrogen are installed outside of the outer premix path 2411, the entire flame can be stabilized by a flame generated by a mixture gas in which natural gas and air are uniformly mixed and a flame generated by hydrogen gas.

Figure 6:
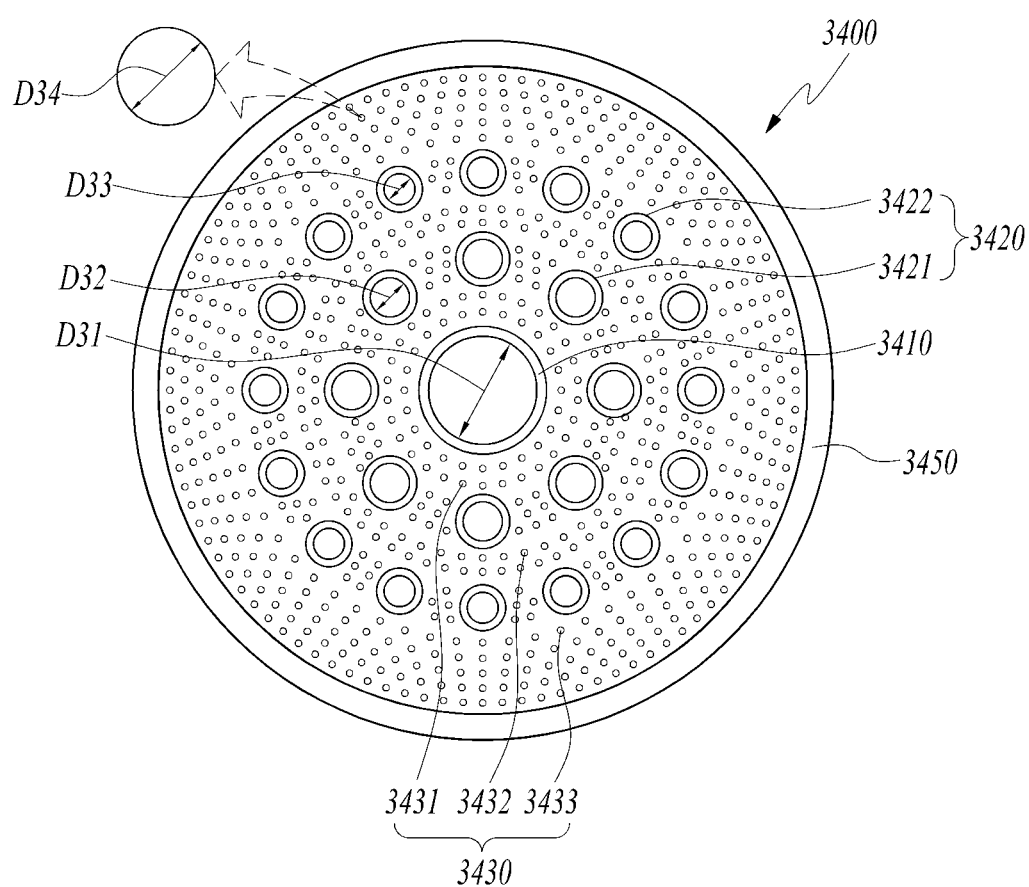
FIG. 6 is a sectional view illustrating a nozzle cut along the radial direction according to a third exemplary embodiment.

Hereinafter, a nozzle according to a third exemplary embodiment will be described. FIG. 6 is a sectional view illustrating a nozzle cut along the radial direction according to a third exemplary embodiment.

Referring to FIG. 6, the nozzle 3400 includes a first tube 3410 disposed at a center of the nozzle, a plurality of second tubes 3420 disposed around the first tube 3410, a plurality of third tubes 3430 disposed around the first tube 3410 and having a smaller diameter than the second tubes 3420, and a nozzle shroud 3450 surrounding the tubes.

The first tube 3410 disposed at the center of the nozzle 3400 has a largest first diameter D31. The second tubes 3420 are circumferentially spaced apart from the first tube 3410 and each have a diameter smaller than that of the first tube 3410.

The third tubes 3430 are disposed around the first tube 3410 and each have a third diameter D34 smaller than that of the second tubes 3420. Hydrogen gas and air may be supplied to the third tubes 3430.

The third tubes 3430 may be spaced apart from the first tube 3410 in the circumferential direction and disposed in the nozzle 3400 at regular intervals. The third tubes 3430 may include an inner group of tubes 3431 disposed between the first tube 3410 and the second tubes 3420, a middle group of tubes 3432 disposed between the inner group of tubes 3431 and the second tubes 3420, and an outer group of tubes 3433 disposed outside of the second tubes 3420.

The first tube 3410, the second tubes 3420, and the third tubes 3430 are disposed in parallel without overlapping each other, and different types of fuel are supplied. For example, natural gas may be supplied to the first tube 3410, fuel in which natural gas and hydrogen gas are mixed may be supplied to the second tubes 3420, and hydrogen gas may be supplied to the third tubes 3430.

The second tubes 3420 may be arranged in two circumferential rows and include inner second tubes 3421 disposed in an inner row around the first tube 3410 and outer second tubes 3422 disposed in an outer row of inner second tubes 3421. The diameter D32 of the inner second tubes 3421 is larger than the diameter D33 of the outer second tubes 3422 so that more fuel may be injected from the inside of the nozzle to stabilize the flame.

In addition, natural gas is supplied along with hydrogen gas to the inner second tubes 3421 and the outer second tubes 3422. Here, a ratio of natural gas to fuel supplied to the inner second tube 3421 may be higher than a ratio of natural gas to fuel supplied to the outer second tube 3422.

According to the third embodiment, if the inner second tubes 3421 having a relatively large diameter are disposed inside the nozzle and the outer second tubes 3422 having a relatively small diameter are disposed outside the inner second tubes 3421, the flame generated in the combustor can be further stabilized.

While one or more exemplary embodiments have been described with reference to the accompanying drawings, it will be apparent to those skilled in the art that various modifications and variations can be made through addition, change, omission, or substitution of components without departing from the spirit and scope of the disclosure as set forth in the appended claims, and these modifications and changes fall within the spirit and scope of the disclosure as defined in the appended claims.

What is claimed is:

1. A nozzle for a combustor, the nozzle comprising:
a first tube disposed in a center of the nozzle and having a first diameter, the first tube being exclusively supplied with a first fuel;
a plurality of second tubes including a plurality of inner second tubes and a plurality of outer second tubes,
the plurality of inner second tubes circumferentially disposed around the first tube to be spaced apart from the first tube, each of the plurality of inner second tubes having a second diameter smaller than the first diameter, and each of the plurality of inner second tubes being exclusively supplied with a second fuel, wherein the second fuel comprises the first fuel mixed with a third fuel,
the plurality of outer second tubes circumferentially disposed around the first tube to be spaced apart from the first tube and disposed radially outside of an inner circumference made by a distribution of the plurality of inner second tubes, each of the plurality of outer second tubes having a third diameter smaller than the first diameter, and each of the plurality of outer second tubes being exclusively supplied with the second fuel; and
a plurality of third tubes disposed around the first tube, each of the plurality of third tubes having a fourth diameter smaller than the second diameter and the third diameter, and each of the plurality of third tubes being exclusively supplied with the third fuel, wherein the third fuel has a higher reactivity than the first fuel,
wherein the first tube, each of the plurality of second tubes, and each of the plurality of third tubes are arranged in parallel with each other; and
wherein the plurality of third tubes are a plurality of inner third tubes, a plurality of middle third tubes and a plurality of outer third tubes, each of the plurality of inner third tubes being disposed radially between the first tube and the inner circumference made by the distribution of the plurality of inner second tubes, each of the plurality of middle third tubes being disposed radially between the inner circumference made by the distribution of the plurality of inner second tubes and an outer circumference made by a distribution of the plurality of outer second tubes, and each of the plurality of outer third tubes being disposed radially outside of the outer circumference made by the distribution of the plurality of outer second tubes.

2. The nozzle of claim 1, wherein the first fuel is natural gas and the third fuel is hydrogen, and the first tube further comprises a central inner fuel path configured to flow natural gas, an outer premix path surrounding the central inner fuel path and configured to flow natural gas mixed with air, and a plurality of swirlers installed in the outer premix path to induce a vortex.

3. The nozzle of claim 1, wherein the second diameter of each of the plurality of inner second tubes is larger than the third diameter of each of the plurality of outer tubes.

4. The nozzle of claim 1, wherein the first tube, each of the plurality of second tubes, and each of the plurality of third tubes are respectively supplied with the first fuel, the second fuel and the third fuel with a time difference.

5. The nozzle of claim 1, wherein the second fuel is supplied to each of the plurality of second tubes after the first fuel is supplied to the first tube, and the third fuel is supplied to each of the plurality of third tubes after the second fuel is supplied to each of the plurality of second tubes.

6. The nozzle of claim 1, wherein the third fuel is supplied to each of the plurality of third tubes after the first fuel is supplied to the first tube, and the second fuel is supplied to each of the plurality of second tubes after the third fuel is supplied to each of the plurality of third tubes.

7. The nozzle of claim 1, wherein a proportion of the first fuel in the second fuel supplied to each of the plurality of outer second tubes is lower than a proportion of the first fuel in the second fuel supplied to each of the plurality of inner second tubes.

8. A combustor comprising:
a burner having a plurality of nozzles; and
a duct assembly coupled to one side of the burner,
wherein each of the plurality of nozzles comprises:
a first tube disposed in a center of the nozzle and having a first diameter, the first tube being exclusively supplied with a first fuel;
a plurality of second tubes including a plurality of inner second tubes and a plurality of outer second tubes,
the plurality of inner second tubes circumferentially disposed around the first tube to be spaced apart from the first tube, each of the plurality of inner second tubes having a second diameter smaller than the first diameter, and each of the plurality of inner second tubes being exclusively supplied with a second fuel, wherein the second fuel comprises the first fuel mixed with a third fuel,
the plurality of outer second tubes circumferentially disposed around the first tube to be spaced apart from the first tube and disposed radially outside of an inner circumference made by a distribution of the plurality of inner second tubes, each of the plurality of outer second tubes having a third diameter smaller than the first diameter, and each of the plurality of outer second tubes being exclusively supplied with the second fuel; and
a plurality of third tubes disposed around the first tube, each of the plurality of third tubes having a fourth diameter smaller than the second diameter and the third diameter, and each of the plurality of third tubes being exclusively supplied with the third fuel, wherein the third fuel has a higher reactivity than the first fuel,
wherein the first tube, each of the plurality of second tubes, and each of the plurality of third tubes are arranged in parallel with each other;
wherein the plurality of third tubes are a plurality of inner third tubes, a plurality of middle third tubes and a plurality of outer third tubes, each of the plurality of inner third tubes being disposed radially between the first tube and the inner circumference made by the distribution of the plurality of inner second tubes; each of the plurality of middle third tubes being disposed radially between the inner circumference made by the distribution of the plurality of inner second tubes and an outer circumference made by a distribution of the plurality of outer second tubes; and each of the plurality of outer third tubes being disposed radially outside of the outer circumference made by the distribution of the plurality of outer second tubes.

9. The combustor of claim 8, wherein the first fuel is natural gas and the third fuel is hydrogen, and the first tube of each of the plurality of nozzles further comprises a central inner fuel path configured to flow natural gas flows, an outer premix path surrounding the central inner fuel path and configured to flow natural gas mixed with air, and a plurality of swirlers installed in the outer premix path to induce a vortex.

10. The combustor of claim 8, wherein the second diameter of each of the plurality of inner second tubes of each of the plurality of nozzles is larger than the third diameter of each of the plurality of outer second tubes of each of the plurality of nozzles.

11. The combustor of claim 8, wherein for each of the plurality of nozzles, the first tube, each of the plurality of second tubes, and each of the plurality of third tubes are respectively supplied with the first fuel, the second fuel and the third fuel with a time difference.

12. The combustor of claim 8, wherein a proportion of the first fuel in the second fuel supplied to each of the plurality of outer second tubes of each of the plurality of nozzles is lower than a proportion of the first fuel in the second fuel supplied to the each of the plurality of inner second tubes of each of the plurality of nozzles.

13. A gas turbine comprising:
a compressor configured to compress an air introduced from an outside;
a combustor configured to produce combustion gas; and
a turbine having a plurality of turbine blades rotated by the combustion gas produced from the combustor,
wherein the combustor comprises:
a burner having a plurality of nozzles; and
a duct assembly coupled to one side of the burner,
wherein each of the plurality of nozzles comprises:
a first tube disposed in a center of each of the plurality of nozzles and having a first diameter, the first tube being exclusively supplied with a first fuel;
a plurality of second tubes including a plurality of inner second tubes and a plurality of outer second tubes,
the plurality of inner second tubes circumferentially disposed around the first tube to be spaced apart from the first tube, each of the plurality of inner second tubes having a second diameter smaller than the first diameter, and each of the plurality of inner second tubes being exclusively supplied with a second fuel, wherein the second fuel comprises the first fuel mixed with a third fuel,
the plurality of outer second tubes circumferentially disposed around the first tube to be spaced apart from the first tube and disposed radially outside of an inner circumference made by a distribution of the plurality of inner second tubes, each of the plurality of outer second tubes having a third diameter smaller than the first diameter, and each of the plurality of outer second tubes being exclusively supplied with the second fuel;
a plurality of third tubes disposed around the first tube, each of the plurality of third tubes having a fourth diameter smaller than the second diameter and the third diameter, and each of the plurality of third tubes being exclusively supplied with the third fuel, wherein the third fuel has a higher reactivity than the first fuel,
wherein the first tube, each of the plurality of second tubes, and each of the plurality of third tubes are arranged in parallel with each other; and
wherein the plurality of third tubes are a plurality of inner third tubes, a plurality of middle third tubes and a plurality of outer third tubes, each of the plurality of inner third tubes being disposed radially between the first tube and the inner circumference made by the distribution of the plurality of inner second tubes; each of the plurality of middle third tubes being disposed radially between the inner circumference made by the distribution of the plurality of inner second tubes and an outer circumference made by a distribution of the plurality of outer second tubes; and each of the plurality of outer third tubes being disposed radially outside of the outer circumference made by the distribution of the plurality of outer second tubes.

14. The gas turbine of claim 13, wherein a proportion of the first fuel in the second fuel supplied to each of the plurality of outer second tubes of each of the plurality of nozzles is lower than a proportion of the first fuel in the second fuel supplied to the each of the plurality of inner second tubes of each of the plurality of nozzles.

* * * * *